(12) United States Patent
McClanahan et al.

(10) Patent No.: US 9,031,899 B2
(45) Date of Patent: May 12, 2015

(54) MIGRATION IN A DISTRIBUTED FILE SYSTEM

(75) Inventors: Edward D. McClanahan, Pleasanton, CA (US); Rajni Balasubramanian, Campbell, CA (US); Sivakumar Darimisetty, Tirupati (IN)

(73) Assignee: Brocade Communications Systems, Inc., San Jose, CA (US)

( * ) Notice: Subject to any disclaimer, the term of this patent is extended or adjusted under 35 U.S.C. 154(b) by 2063 days.

(21) Appl. No.: 11/952,558

(22) Filed: Dec. 7, 2007

(65) Prior Publication Data
US 2009/0150460 A1    Jun. 11, 2009

(51) Int. Cl.
*G06F 17/30*  (2006.01)

(52) U.S. Cl.
CPC .... *G06F 17/30153* (2013.01); *G06F 17/30079* (2013.01)

(58) Field of Classification Search
CPC ................................................. G06F 17/30079
See application file for complete search history.

(56) References Cited

U.S. PATENT DOCUMENTS

| | | | |
|---|---|---|---|
| 5,832,522 A * | 11/1998 | Blickenstaff et al. | 1/1 |
| 6,804,719 B1 * | 10/2004 | Cabrera et al. | 709/226 |
| 6,933,039 B2 * | 8/2005 | Yamamoto | 428/195.1 |
| 6,938,056 B2 * | 8/2005 | Burns et al. | 1/1 |
| 7,373,468 B1 * | 5/2008 | Gupta | 711/162 |
| 7,765,189 B2 * | 7/2010 | Yamakawa | 707/640 |
| 2004/0049513 A1 * | 3/2004 | Yakir et al. | 707/100 |
| 2005/0015409 A1 * | 1/2005 | Cheng et al. | 707/200 |
| 2005/0216532 A1 * | 9/2005 | Lallier | 707/204 |
| 2006/0212481 A1 * | 9/2006 | Stacey et al. | 707/104.1 |
| 2006/0235907 A1 * | 10/2006 | Kathuria et al. | 707/204 |
| 2008/0154988 A1 * | 6/2008 | Shiozawa et al. | 707/204 |

* cited by examiner

*Primary Examiner* — Ajith Jacob
(74) *Attorney, Agent, or Firm* — Conley Rose, P.C.

(57) ABSTRACT

A method includes creating a temporary target s-stub file. The temporary target s-stub file points to a source share. The method further includes creating a plurality of stub files in a target top-level directory on a target share. Each stub file out of the plurality of stub files corresponds to source data. The source data includes files and subdirectories in a source top-level directory on a source share. The plurality of stub files include source information, the source information is associated with the temporary target s-stub file, and a source s-stub file points to the source share. The method further includes remapping the source s-stub to point to the target share.

24 Claims, 5 Drawing Sheets

MIGRATION IN A DISTRIBUTED FILE SYSTEM

BACKGROUND

Network administrators need to efficiently manage file servers and file server resources while keeping them protected, yet accessible, to authorized users. The practice of storing files on distributed servers makes the files more accessible to users, reduces bandwidth use, expands capacity, and reduces latency. However, as the number of distributed servers rises, users may have difficulty finding files, and the costs of maintaining the network increase. Additionally, as networks grow to incorporate more users and servers, both of which could be located in one room or distributed all over the world, the complexities administrators face increase manifold. Any efficiency that can be gained without a concordant increase in cost would be advantageous.

SUMMARY

In order to capture such efficiencies, methods and systems are disclosed herein. In at least some disclosed embodiments, a method includes creating a temporary target s-stub file. The temporary target s-stub file points to a source share. The method further includes creating a plurality of stub files in a target top-level directory on a target share. Each stub file out of the plurality of stub files corresponds to source data. The source data includes files and subdirectories in a source top-level directory on a source share. The plurality of stub files include source information, the source information is associated with the temporary target s-stub file, and a source s-stub file points to the source share. The method further includes remapping the source s-stub to point to the target share.

In other disclosed embodiments, a computer-readable medium stores a software program that, when executed by a processor, causes the processor to create a temporary target s-stub file. The temporary target s-stub file points to a source share. The processor is further caused to create a plurality of stub files in a target top-level directory on a target share. Each stub file out of the plurality of stub files corresponds to source data. The source data includes files and subdirectories in a source top-level directory on a source share. The plurality of stub files include source information, the source information is associated with the temporary target s-stub file, and a source s-stub file points to the source share. The processor is further caused to remap the source s-stub to point to the target share.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the accompanying drawings and detailed description, wherein like reference numerals represent like parts.

DETAILED DESCRIPTION

It should be understood at the outset that although an illustrative implementation appears below, the present disclosure may be implemented using any number of techniques whether currently known or later developed. The present disclosure should in no way be limited to the illustrative implementations, drawings, and techniques illustrated below, but may be modified within the scope of the appended claims along with their full scope of equivalents.

Certain terms are used throughout the following claims and discussion to refer to particular components. This document does not intend to distinguish between components that differ in name but not function. In the following discussion and in the claims, the terms "including" and "comprising" are used in an open-ended fashion, and thus should be interpreted to mean "including but not limited to". Also, the term "couple" or "couples" is intended to mean an indirect or direct electrical connection, optical connection, etc. Thus, if a first device couples to a second device, that connection may be through a direct connection, or through an indirect connection via other devices and connections. Additionally, the term "system" refers to a collection of two or more hardware components, and may be used to refer to an electronic device or circuit, or a portion of an electronic device or circuit.

Figure 1:
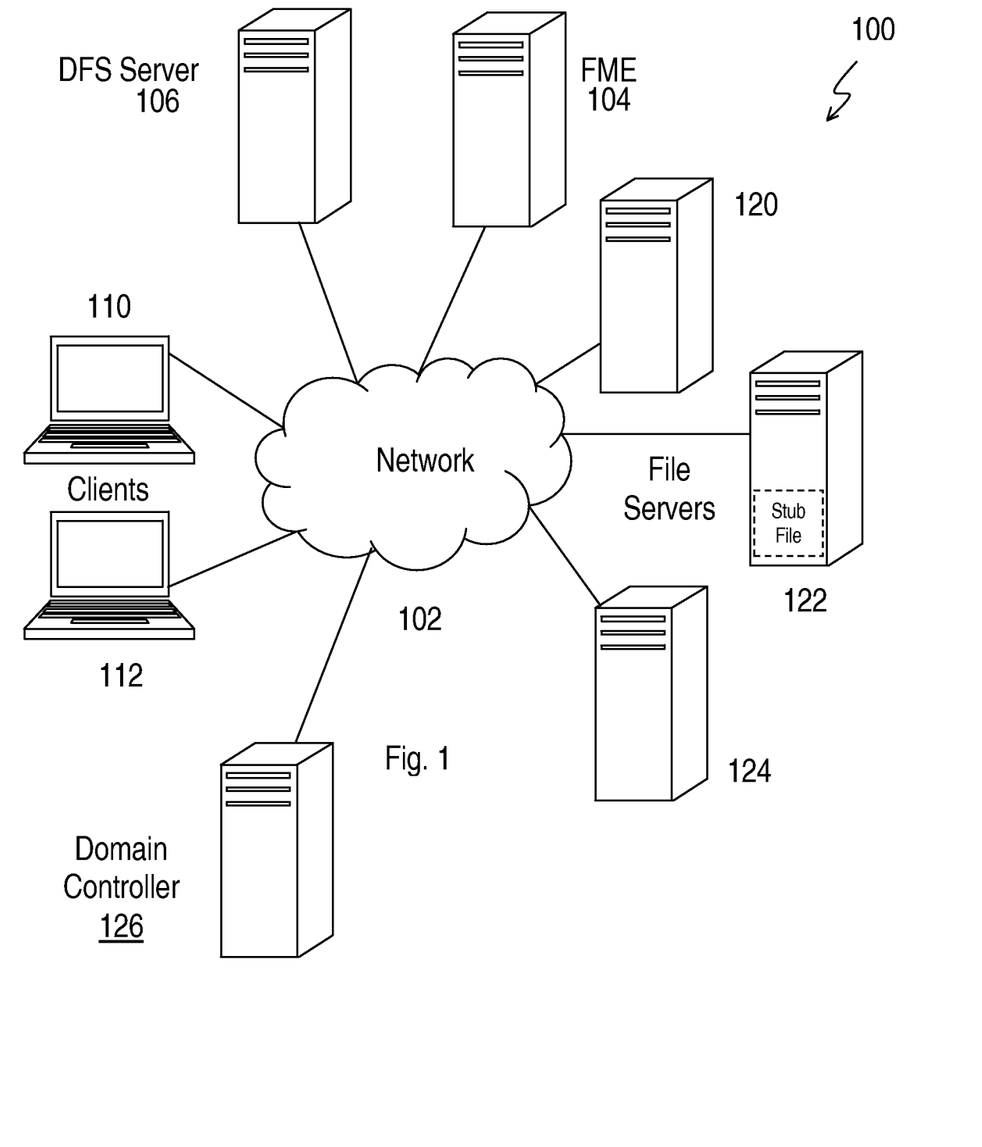
FIG. 1 illustrates a distributed file system ("DFS"), employing a DFS server and file migration engine ("FME") in accordance with at least some embodiments.

FIG. 1 shows an illustrative distributed file system ("DFS"). In the example of FIG. 1, two user computers, also called clients, 110, 112 are coupled to three file servers ("servers") 120, 122, and 124, via a network 102. The system of FIG. 1 enables efficient data access by the clients 110, 112 because available disk space on any server 120-124 may be utilized by any client 110, 112 coupled to the network 102. Contrastingly, if each client 110, 112 had only local storage, data access by the clients 110, 112 would be limited. Server 122 contains a stub file, which is discussed in greater detail below.

A DFS server 106 is also coupled to the network 102. Preferably, the DFS server 106 is a Microsoft DFS server. The DFS server 106 enables location transparency of directories located on the different file servers 120-124 coupled to the network 102. Location transparency enables users using the clients 110, 112 ("users") to view directories residing under disparate servers 120-124 as a single directory. For example, suppose a large corporation stores client data distributed across server 120 in Building 1, server 122 in Building 2, and server 124 in Building 3. An appropriately configured DFS server 106 allows users to view a directory labeled \\Data\ClientData containing the disparate client data from the three servers 120-124. Here, "Data" is the machine name hosting "ClientData." The data in the directory \\Data\ClientData are not copies, i.e., when a user uses a client 110, 112 to access a file located in a directory the user perceives as \\Data\ClientData\ABC\, the client 110, 112 actually accesses the file in the directory \\Server122\bldg2\clidat\ABCcorp\. Here, "bldg2" is a share on server 122. Most likely, the user is unaware of the actual location, actual directory, or actual subdirectories that the client 110, 112 is accessing. Preferably, multiple DFS servers 106 are used to direct traffic among the various servers 120-124 and clients 110, 112 to avoid having a bottleneck in the system and a single failure point. Accordingly, a domain controller 126 is coupled to the network 102. The domain controller 126 comprises logic to select from among the various DFS servers for routing purposes. Preferably, the domain controller is configured via Microsoft Cluster Services.

Considering a more detailed example, suppose employee data regarding employees A, B, and C are stored on servers 120, 122, and 124 respectively. The employee information regarding A, B, and C are stored in the directories \\Server120\employee\personA\, \\Server122\emply\bldg2\employeeB\, and \Server124\C\, respectively. Thornton is a human resources manager using a client 110. Appropriately configured, the DFS server 106 shows Thornton the directory \\HR\employees\ containing subdirectories A, B, and C, which contain the employee information from the disparate servers 120-124 respectively. When Thornton uses the client 110 to request the file "Bcontracts.txt," located at the path he perceives to be \\HR\employees\B\Bcontracts.txt, the client 110 actually sends a request to the DFS server 106. In response, the DFS server 106 returns the path \\Server122\emply\bldg2\employeeB\ to the client 110. The returned path is where the file Bcontracts.txt is actually located, and is termed a "referral." Next, the client 110 "caches," or stores, the referral in memory. Armed with the referral, the client 110 sends a request to the server 122 for the file. Thornton is unaware of the referral. Preferably, the client 110 sends subsequent requests for Bcontracts.txt directly to server 122, without first sending a request to the DFS server 106, until the cached referral expires or is invalidated. If the client 110 is rebooted, the cached referral will be invalidated.

A file migration engine ("FME") 104 is also coupled to the network 102. The FME 104 receives traffic, including requests, between the clients 110, 112 and the servers 120-124. Preferably, the DFS server 106 is configured to send requests to the FME 104. After receiving a request, the FME 104 modifies the request. Specifically, the FME 104 modifies the request's routing information in order to forward the request to a file server 120-124. Also, the FME 104 moves, or migrates, data among the servers 120-124, and the FME 104 caches each migration. Considering these capabilities in conjunction with each other, the FME 104 performs any or all of: migrating data from one file server (a "source" server) to another file server (a "target" server); caching the new location of the data; and forwarding a request for the data, destined for the source file server, to the target file server by modifying the request. Subsequently, in at least some embodiments, the FME 104 continues to receive traffic between the client and the target file server.

In other embodiments, the FME 104 removes itself as an intermediary, thereby ceasing to receive such traffic between the client and the target file server. Such functionality is useful when the FME 104 is introduced to the network 102 specifically for the purpose of migrating data, after which the FME 104 is removed from the network 102.

Although only three file servers 120-124, one DFS server 106, one FME 104, one domain controller 126, and two clients 110, 112 are shown in FIG. 1, note that any number of these devices can be coupled via the network 102. For example, multiple FMEs 104 may be present and clustered together if desired, or multiple DFS servers 106 may be present. Indeed, the FME 104 may even fulfill the responsibilities of the DFS server 106 by hosting DFS functionality. As such, clients need not be configured to be aware of the multiple FMEs 104. Please also note that the data (termed "source data" before the migration and "target data" after the migration) may be a file; a directory (including subdirectories); multiple files; multiple directories (including subdirectories); a portion or portions of a file, multiple files, a directory (including subdirectories), or multiple directories (including subdirectories); or any combination of preceding.

Returning to the previous example, suppose server 124 in Building 3 has received a storage upgrade, such that all client data can now be stored exclusively on server 124. Rose is a computer administrator. Because the client data is sensitive, Rose prefers all the client data to be on one server, server 124, for increased security. Consequently, Rose implements a "data life-cycle policy." A data life-cycle policy is a set of rules that the FME 104 uses to determine the proper location of data among the file servers 120-124. In the present example, Rose configures the data life-cycle policy to include a rule commanding that all client data belongs on server 124. As such, the FME 104 periodically scans the servers 120-124, and the FME 104 migrates client data based on the rule. The migration preferably occurs without users experiencing interruption of service or needing to adjust their behavior in response to the migration.

In an effort to further increase security, Rose outfits file server 124 with encryption capabilities, thus making the file server 124 an "encryption server." An encryption server 124 obscures data stored on the encryption server by using an encryption algorithm to manipulate the data into an unrecognizable form according to a unique encryption key. A decryption algorithm restores the data by reversing the manipulation using the same encryption key or a different unique decryption key. The more complex the encryption algorithm, the more difficult it becomes to decrypt the data without access to the correct key. By using the FME 104 to migrate client data to the encryption server 124, Rose is relieved of the burden of outfitting every server containing client data with encryption capability, and Rose is not required to interrupt service to the users during the migration. Any requests to the migrated client data are routed to server 124 by the FME 104 as described above. As such, encryption can be applied to any data on the servers 120-124, even though servers 120 and 122 do not have encryption capabilities, as long as encryption server 124 can store the data. If, for example, the encryption server cannot store all the data to be encrypted, Rose can couple multiple encryption servers to the network 102 until the need is met. When encryption is provided in such a fashion, encryption is termed a "server function."

Considering another server function, file server 120 has "de-duplication" functionality, making the server a "de-duplication server." De-duplication is sometimes referred to as "single instance store" (SIS) when applied at the file level; however, this document uses the term de-duplication as applying to any granularity of data. A de-duplication server periodically searches its storage for duplicated information, and preferably deletes all but one instance of the information to increase storage capacity. The deletion of all but one instance of identical data is termed "de-duplicating" the data. Any requests to the deleted information are routed to the one instance of the information remaining. For example, suppose the servers 120, 122, and 124 contain duplicate copies of the same file, and the file has a size of 100 megabytes (MB). The servers 120-124 are collectively using 300 MB to store the same 100 MB file. The files on server 122 and 124 preferably are migrated to de-duplication server 120, resulting in three identical files on de-duplication server 120. The de-duplication server 120 is programmed to de-duplicate the contents of its storage, and thus, deletes two out of the three files. With only one file remaining, the servers 120-124 collectively have 200 MB more space to devote to other files. De-duplication applies not only to whole files, but to portions of files as well. Indeed, the source data may be a portion of a file, and consequently, the server function is applied to the portion. The data life-cycle policy rules used to determine data to be migrated to the de-duplication server 120 need not include a rule requiring that only identical data be migrated. Rather, data that is merely similar can be migrated, leaving the de-duplication server 120 to determine if the data should be de-duplicated or not.

Considering yet another server function, server 122 comprises a "compression server." A compression server increases storage capacity by reducing the size of a file in the compression server's storage. A file size is reduced by eliminating redundant data within the file. For example, a 300 KB file of text might be compressed to 184 KB by removing extra spaces or replacing long character strings with short representations. Other types of files can be compressed (e.g., picture and sound files) if such files have redundant information. Files on servers 120 and 124 to be compressed are migrated to compression server 122. The compression server 122 is programmed to compress files in its storage, thus allowing for more files to be stored on the collective servers 120-124 in the same amount of space. The FME 104 forwards any requests for the migrated information to compression server 122 as described above.

The uninterrupted access to data across multiple servers 120-124 is used to apply server functions to the entire distributed file system without requiring that each server have the ability to perform the server function. In at least some preferred embodiments, a server 120-124 applies server functions to only portions of the server's storage, reserving other portions of the server's storage for other server functions or storage that is not associated with any server function. In such a scenario, the target file server may be the same as the source file server. The server functions described above are used as examples only; all server functions can be used without departing from the scope of various preferred embodiments.

Consider the FME 104 migrating the file Bcontracts.txt to compression server 120. In order to provide access to the file without interruption, the FME 104 creates a "stub file," or simply a "stub," as part of the migration process. A stub is a metadata file preferably containing target information and source information. Target information includes information regarding a target file server, target share (a discrete shared portion of memory on a target file server), and target path in order to describe the location of data moved to the target file server. Target information also includes target type information to describe the nature of the data (e.g., whether the target data is a file or directory). Preferably, the stub also includes a modified timestamp. Source information includes similar information that references the source location of the data, e.g., source file server, source share, etc. A stub need not reflect a value for every one of the categories listed above; rather, a stub can be configured to omit some of the above categories. Because a stub is a file, the stub itself has metadata. Hence, target and source information may be implicit in the stub's metadata and location. Indeed, source information may usually be determined from the location and metadata of the stub file because stubs are left in the location of source data when a FME 104 moves the source data from a source file server to a target file server. As such, target information is preferably read from a stub's contents, while source information is read from a stub's metadata. A stub preferably comprises an XML file.

The terms "source" file server and "target" file servers are merely descriptors in identifying data flow. A source file server is not perpetually a source file server, and indeed can be simultaneously a source file server and a target file server if more than one operation is being performed or if the data is being migrated from one portion of a file server to another portion of the same file server. Additionally, in the scenario where a stub points to second stub, and the second stub points to a file, the file server on which the second stub resides is simultaneously a source file server and a target file server.

An "s-stub" is a stub with unique properties. Preferably, the server information and share information in an s-stub are combined, and the server information and share information are represented in the stub as a GUID. When the FME 104 reads target information in an s-stub, the target share and server are represented by, e.g., the hexadecimal number 000000000000000A and the target path information is "\Tpath\". Next, the FME 104 reads a table, where the number 000000000000000A is associated with share number one on server 122, or "\\server122\s1". As a result, the FME 104 searches for the requested file in \\server122\s1\Tpath\. The s-stub need not only point to the root of the share, but can point to any directory within the share as well. Also, the target s-stub file is preferably unable to be remapped due to being marked as non-remappable upon creation.

Figure 2:
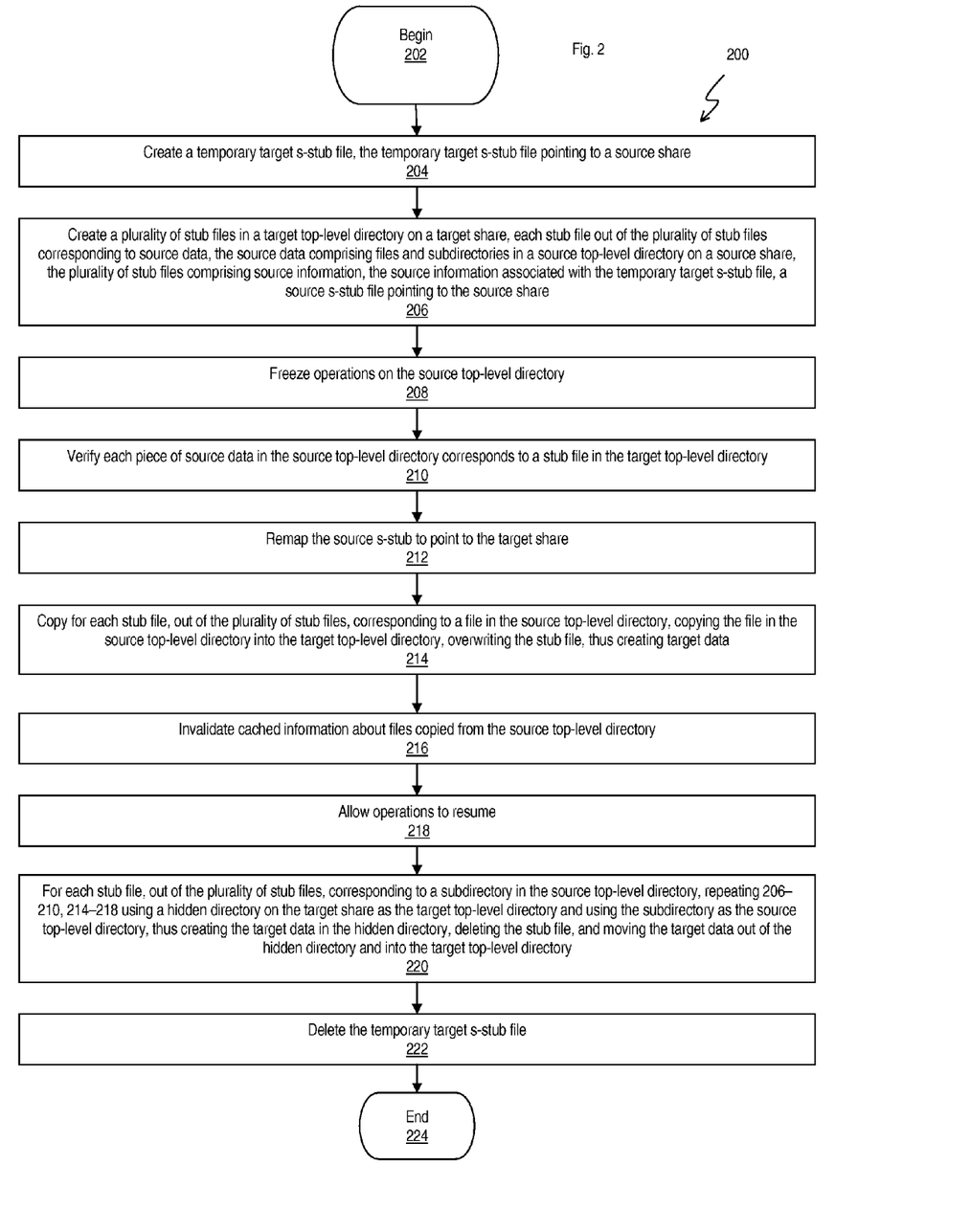
FIG. 2 illustrates a method of migration in accordance with at least some embodiments.

Referring to FIGS. 1 and 2, FIG. 2 illustrates a method 200 of migration of a source share to a target share, beginning at 202 and ending at 224. Preferably, the determination of the source top-level directory, or which share to migrate, is based on a data life-cycle policy as described above. First, a temporary target s-stub file is created 204 such that the temporary target s-stub file points to a source share, preferably by enumerating a path on the source share. Preferably, the temporary target s-stub file is unable to be remapped.

In addition to the temporary target stub, a source s-stub file already points to the source share, also preferably by enumerating a path on the source share. Next, a target top-level directory is created 206 on a target share in preparation for the migration of the source share. The target top-level directory includes stub files, and each stub file corresponds to source data. The source data includes files and subdirectories in a source top-level directory on a source share. The stub files include source information, and the source information is associated with the temporary target s-stub file. Due to the association, requests routed to the stub files are redirected to the source share because the temporary target s-stub file points to the source share. Preferably, operations on the source top-level directory are frozen 208, and verification 210 that each file or subdirectory in the source top-level directory corresponds to a stub file in the target top-level directory occurs.

Next, the source s-stub is remapped 212 to point to the target share. The remap of the source s-stub file can include adjusting the path enumerated by the source s-stub file to a path on the target share, or merely overwriting the source s-stub with a new s-stub enumerating a path on the target share. Any requests for the source data will subsequently be redirected to the target data because the source s-stub now points to the target data. Preferably, for each stub file corresponding to a file in the source top-level directory, the file in the source top-level directory is copied 214 into the target top-level directory, overwriting the stub file. The files in the target share are termed target data. Preferably, the copying is performed for source data that is the target of an access before the access occurs. Should a client request access to the source data, the data is immediately copied, probably out-of-turn, before the access occurs. Preferably, cached information about files copied from the source top-level directory is invalidated 216, and operations are allowed 218 to resume.

Preferably, for each stub file corresponding to a subdirectory in the source top-level directory, repeating 220 creating the target top-level directory and copying the files in the source-top level directory using a hidden directory on the target share as the target top-level directory and using the subdirectory as the source top-level directory, thus creating the target data in the hidden directory, deleting the stub file, and moving the target data out of the hidden directory and into the target top-level directory. Preferably, the temporary target s-stub file is deleted 222. Preferably, updates to the source data are applied to the target data such that the target data becomes identical to the source data. Preferably, the source top-level directory is deleted. Note that the source share and the target share may reside on different file servers, e.g., the source share resides on a first file server, and the target share resides on a second file server.

Figure 3:
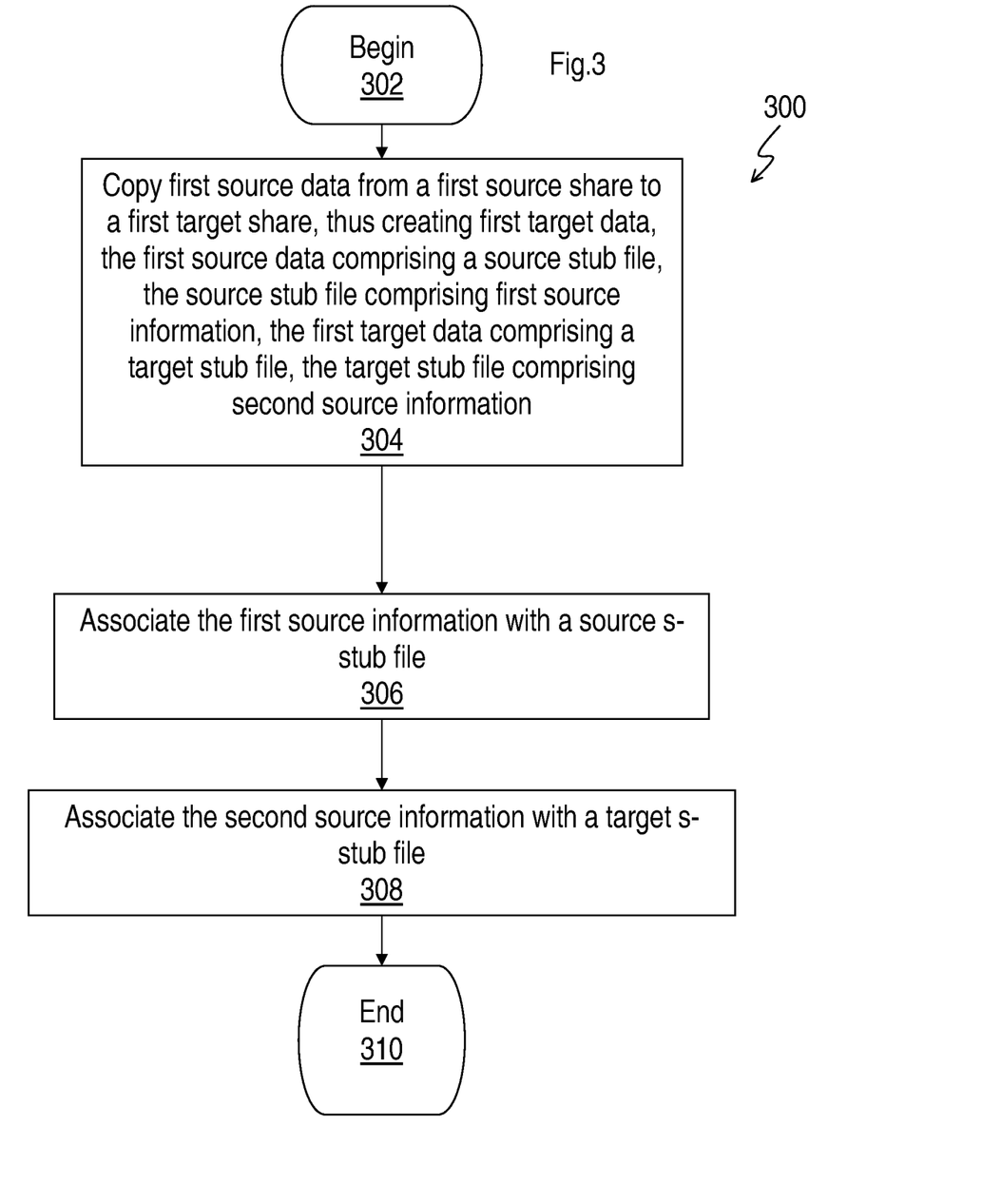
FIG. 3 illustrates a method of backing up data in accordance with at least some embodiments.
Figure 4:
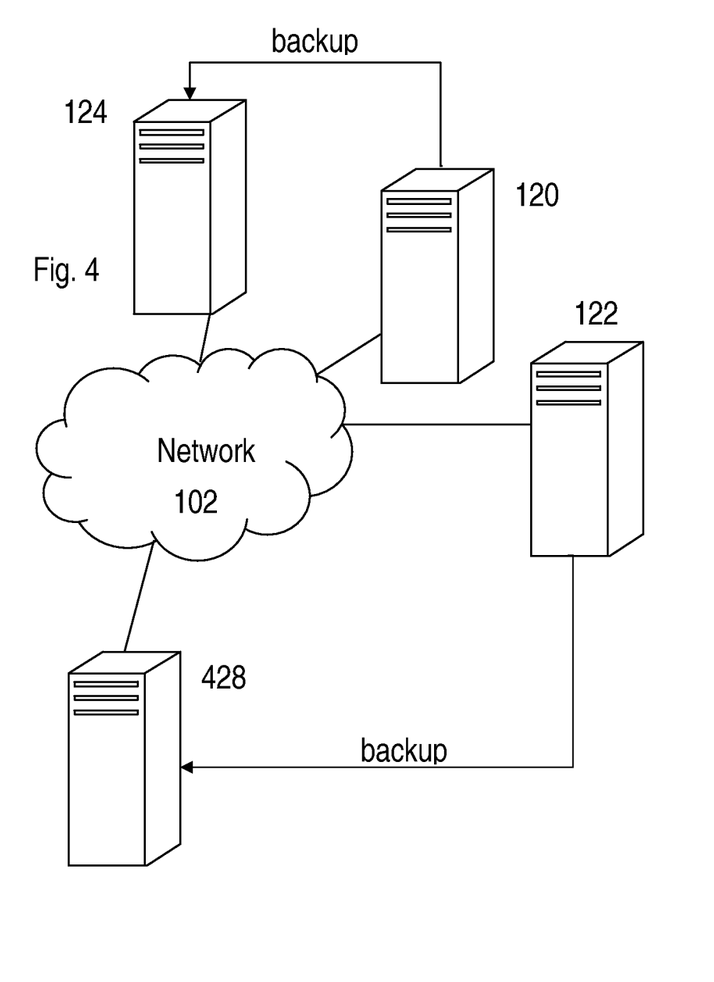
FIG. 4 illustrates hardware useful for a data backup in accordance with at least some embodiments.

Referring to FIGS. 1, 3, and 4, FIG. 3 illustrates a method of backing up data beginning at 302 and ending at 310. In this example, two source servers, 120 and 122, are backed up to two target servers, 124 and 428. The first source server 120 has at least one stub file ("source stub file") as part of the data to be backed up ("first source data"). The stub file points to data on the second source server 122 ("second source data"), which will also be backed up. Upon completion of the backup, the backup stub ("target stub file") is part of the backup data on the first target server 124 ("first target data"), and the backup stub should point to the backup data on the second target server 428 ("second target data") rather than the second source server 122. First, a first set of source data is copied 304 from a first source share to a first target share, thus creating first target data. As mentioned, the first set of source data includes a source stub file, and the source stub file includes first source information. Many stub files can be included in the first set of source data, but for simplicity one will be discussed. The first target data includes a target stub file, which is the copy of the source stub file. The target stub file includes second source information as it is at a different location than the source stub file.

The second source data is copied from a second source share to a second target share as well, thus creating second target data. A source s-stub file points to the second source data, and a target s-stub file points to the second target data. Preferably, the source s-stub file enumerates a path to the second source data, and the target s-stub file enumerates a path to the second target data. Also, the first source data resides on a first source file server 120, the first target data resides on a first target file server 124, the second source data resides on a second source file server 122, and the second target data resides on a second target file server 428. Next, the first source information is associated 306 with the source s-stub file, and the second source information is associated 308 with the target s-stub file to ensure proper routing of requests. Preferably, a table is updated such that the first source information is associated with the source s-stub via a first entry in the table and the second source information is associated with the target s-stub via a second entry in the table.

The first target data and second target data are used as a first backup of the first source data and second source data respectively. Preferably, as part of the restoration of the backup, the table is updated such that the first source information is associated with the target s-stub, the target s-stub having a name identical to the source s-stub. In this way, a plurality of backups of the first source data and second source data can be created. Each backup is associated with a time unique to each backup and an s-stub unique to each backup. Each backup represents a "snapshot" of the source data at the particular moment in time, and because requests for the source data prompt immediate copying of the source data to the target share, users need not experience an interruption in service while the backup is being performed. Preferably, a particular backup may be selected based on the time associated with the particular backup, and when the particular backup is restored, the table is updated such that the first source information is associated with the s-stub unique to the particular backup.

In at least one embodiment, the table is part of a hierarchy of tables. Two identically identified s-stubs, one in each of two tables, may be associated with the same or different locations via the table entries. A selector is established for which the particular table is selected from within this multi-table hierarchy. Consequently, as part of the restoration of a backup, the selector selects a table associated with the backup to be restored. One of the tables is the default selection, or "default table," and the default table preferably is associated with "live" data, or data accessible to the users. The backup data may be viewed by a computer administrator alongside the live data. This is useful for restoring individual files that have been corrupted and must be restored. Also, partial backups may be implemented, and the table entries not associated with the partial backup will correspond to live data.

Figure 5:
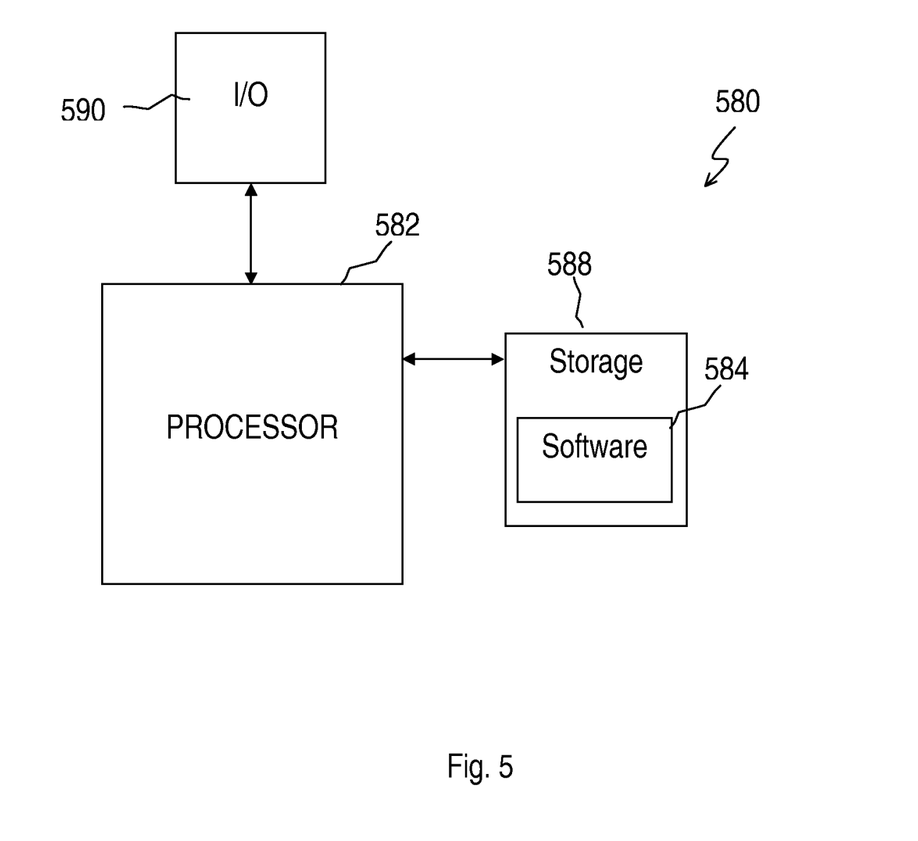
FIG. 5 illustrates a general purpose computer system suitable for implementing at least some embodiments.

The system described above may be implemented on any general-purpose computer with sufficient processing power, memory resources, and throughput capability to handle the necessary workload placed upon the computer. FIG. 5 illustrates a typical, general-purpose computer system 580 suitable for implementing one or more embodiments disclosed herein. The computer system 580 includes a processor 582 (which may be referred to as a central processor unit or CPU) that is in communication with memory devices including storage 588, and input/output (I/O) 590 devices. The processor may be implemented as one or more CPU chips.

In various embodiments, the storage 588 comprises a computer-readable medium such as volatile memory (e.g., RAM), non-volatile storage (e.g., Flash memory, hard disk drive, CD ROM, etc.), or combinations thereof. The storage 588 comprises software 584 that is executed by the processor 582. One or more of the actions described herein are performed by the processor 582 during execution of the software 584.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

We claim:

1. A method comprising:
   a) creating a temporary target s-stub file, the temporary target s-stub file pointing to a source share;
   b) creating a plurality of stub files in a target top-level directory on a target share, each stub file out of the plurality of stub files corresponding to source data, the source data comprising files and subdirectories in a source top-level directory on a source share, the plurality of stub files comprising source information, the source information associated with the temporary target s-stub file, a source s-stub file pointing to the source share; and c) remapping the source s-stub to point to the target share.

2. The method of claim 1, further comprising d) for each stub file, out of the plurality of stub files, corresponding to a file in the source top-level directory, copying the file in the source top-level directory into the target top-level directory, overwriting the stub file, thus creating target data.

3. The method of claim 2, further comprising e) for each stub file, out of the plurality of stub files, corresponding to a subdirectory in the source top-level directory, repeating b) and d) using a hidden directory on the target share as the target top-level directory and using the subdirectory as the source top-level directory, thus creating the target data in the hidden directory, deleting the stub file, and moving the target data out of the hidden directory and into the target top-level directory.

4. The method of claim 1, further comprising deleting the temporary target s-stub file.

5. The method of claim 1, further comprising:
freezing operations on the source top-level directory;
invalidating cached information about files copied from the source top-level directory; and
allowing operations to resume.

6. The method of claim 5, further comprising:
verifying each file and subdirectory in the source top-level directory corresponds to a stub file out of the plurality of stub files in the target top-level directory;
allowing operations to resume if verification fails, and continuing to create the target top-level directory and verify until verification does not fail.

7. The method of claim 1, further comprising performing d) for source data that is the target of an access before the access occurs.

8. The method of claim 1, further comprising applying, to the target data, updates to the source data such that the target data becomes identical to the source data.

9. The method of claim 1, wherein creating the temporary target s-stub file comprises creating the temporary target s-stub file, the temporary target s-stub file pointing to a source share, the temporary target s-stub file unable to be remapped.

10. The method of claim 1, further comprising deleting the source top-level directory.

11. The method of claim 1, wherein the source share and the target share reside on different file servers.

12. The method of claim 1, further comprising determining the source data based on a life-cycle migration policy.

13. A computer-readable medium storing a software program that, when executed by a processor, causes the processor to:

a) create a temporary target s-stub file, the temporary target s-stub file pointing to a source share;

b) create a plurality of stub files in a target top-level directory on a target share, each stub file out of the plurality of stub files corresponding to source data, the source data comprising files and subdirectories in a source top-level directory on a source share, the plurality of stub files comprising source information, the source information associated with the temporary target s-stub file, a source s-stub file pointing to the source share; and c) remap the source s-stub to point to the target share.

14. The computer-readable medium of claim 13, further causing the processor to d) for each stub file, out of the plurality of stub files, corresponding to a file in the source top-level directory, copy the file in the source top-level directory into the target top-level directory, overwriting the stub file, thus creating target data.

15. The computer-readable medium of claim 14, further causing the processor to e) for each stub file, out of the plurality of stub files, corresponding to a subdirectory in the source top-level directory, repeat b) and d) using a hidden directory on the target share as the target top-level directory and using the subdirectory as the source top-level directory, thus creating the target data in the hidden directory, deleting the stub file, and moving the target data out of the hidden directory and into the target top-level directory.

16. The computer-readable medium of claim 13, further causing the processor to delete the temporary target s-stub file.

17. The computer-readable medium of claim 13, further causing the processor to:
freeze operations on the source top-level directory;
invalidate cached information about files copied from the source top-level directory; and
allow operations to resume.

18. The computer-readable medium of claim 17, further causing the processor to:
verify each file and subdirectory in the source top-level directory corresponds to a stub file out of the plurality of stub files in the target top-level directory;
allow operations to resume if verification fails, and continue to create the target top-level directory and verify until verification does not fail.

19. The computer-readable medium of claim 13, further causing the processor to perform d) for source data that is the target of an access before the access occurs.

20. The computer-readable medium of claim 13, further causing the processor to apply, to the target data, updates to the source data such that the target data becomes identical to the source data.

21. The computer-readable medium of claim 13, wherein creating the temporary target s-stub file causes the processor to create the temporary target s-stub file, the temporary target s-stub file pointing to a source share, the temporary target s-stub file unable to be remapped.

22. The computer-readable medium of claim 13, further causing the processor to delete the source top-level directory.

23. The computer-readable medium of claim 13, wherein the source share and the target share reside on different file servers.

24. The computer-readable medium of claim 13, further causing the processor to determine the source data based on a life-cycle migration policy.

* * * * *